United States Patent
Diab et al.

(10) Patent No.: US 9,008,129 B2
(45) Date of Patent: Apr. 14, 2015

(54) SYSTEM AND METHOD FOR FREQUENCY DIVISION MULTIPLEXED HIGH SPEED PHYSICAL LAYER DEVICES

(75) Inventors: Wael William Diab, San Francisco, CA (US); Scott Powell, Alisa Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 624 days.

(21) Appl. No.: 12/708,175

(22) Filed: Feb. 18, 2010

(65) Prior Publication Data

US 2011/0200056 A1   Aug. 18, 2011

(51) Int. Cl.
| | | |
|---|---|---|
| H04J 3/04 | (2006.01) | |
| H04L 12/931 | (2013.01) | |
| H04L 12/26 | (2006.01) | |
| H04L 12/801 | (2013.01) | |

(52) U.S. Cl.
CPC .......... H04L 49/352 (2013.01); H04L 43/0882 (2013.01); H04L 47/10 (2013.01)

(58) Field of Classification Search
CPC ........ H04N 21/4341; H04J 1/04; H04J 1/045; H04L 2012/5614
USPC .......... 370/252, 295, 437, 463, 480, 481, 535
See application file for complete search history.

(56) References Cited

U.S. PATENT DOCUMENTS

| | | | | |
|---|---|---|---|---|
| 5,923,361 A * | 7/1999 | Sutton, Jr. | ........................ | 725/93 |
| 7,593,315 B2 * | 9/2009 | Barrass | ......................... | 370/201 |
| 7,724,847 B2 * | 5/2010 | Bublil et al. | ................... | 375/346 |
| 7,986,735 B2 * | 7/2011 | Murayama et al. | ........... | 375/259 |
| 8,046,602 B2 * | 10/2011 | Mani et al. | ..................... | 713/300 |
| 2005/0041802 A1 * | 2/2005 | Gomez et al. | ................... | 380/33 |
| 2006/0140632 A1 * | 6/2006 | Mohs et al. | ..................... | 398/85 |
| 2007/0201380 A1 | 8/2007 | Ma et al. | | |
| 2008/0084828 A1 * | 4/2008 | Gonzalez et al. | ............. | 370/252 |
| 2008/0084951 A1 * | 4/2008 | Chen et al. | .................... | 375/347 |
| 2008/0174664 A1 * | 7/2008 | Murayama et al. | ...... | 348/211.11 |
| 2009/0059933 A1 * | 3/2009 | Huang et al. | .................. | 370/401 |
| 2010/0259433 A1 * | 10/2010 | Bishop et al. | ................. | 341/155 |
| 2011/0076018 A1 * | 3/2011 | Ghiggino et al. | ............... | 398/58 |

FOREIGN PATENT DOCUMENTS

DE    10301637 A1    7/2004

OTHER PUBLICATIONS

Arshad Chowdhury et al., "10x100'Gb/s Transmissions using Optical Carrier Suppression and Separation Technique and RZ-DQPSK Modulation for Metro-Ethernet Transport System," IEEE, Nov. 9-13, 2008.
European Search Report, May 3, 2011.
TW Office Action, May 27, 2014.
CN Office Action, Apr. 2, 2013.

* cited by examiner

Primary Examiner — Ricky Ngo
Assistant Examiner — Christine Ng
(74) Attorney, Agent, or Firm — Duane S. Kobayashi

(57) ABSTRACT

A system and method for frequency division multiplexed high speed physical layer devices. A next generation Ethernet device can be generated through reuse of existing architectures. Multiple instantiations of an existing architecture can be supported on a given wire pair by frequency division multiplexing on a number of carriers. The multiple instantiations can enable multiple modes that can support different configurations, variable rates, and energy efficient Ethernet.

12 Claims, 5 Drawing Sheets

SYSTEM AND METHOD FOR FREQUENCY DIVISION MULTIPLEXED HIGH SPEED PHYSICAL LAYER DEVICES

BACKGROUND

1. Field of the Invention

The present invention relates generally to Ethernet systems and methods and, more particularly, to a system and method for frequency division multiplexed high speed physical layer devices.

2. Introduction

Ethernet devices continue to evolve in capability as the incremental increases in the standardized transmission rates have progressed by orders of magnitude. In a relatively short period of time, transmission rates for standardized Ethernet devices have progressed from 10 Mbit/s to 100 Mbit/s, from 100 Mbit/s to 1 Gbit/s, and more recently, from 1 Gbit/s to 10 Gbit/s. Efforts are ongoing to identify the next transmission rate that is to be adopted as the next standard of Ethernet performance. Whether 40 Gbit/s or 100 Gbit/s, the next transmission rate will be significantly higher than 10 Gbit/s.

The significant advances in the standardized transmission rates has provided substantial benefits in increasing the available bandwidth in an Ethernet network. These large increases in available bandwidth have enabled significant changes in the applications that can be supported across various types of networks. As the cost of bandwidth has decreased, so also has the performance barriers that have hindered certain types of applications.

Notwithstanding the substantial benefits that have been realized by the large increases in transmission rates, those same large increases in transmission rates can likewise create other cost barriers that can hinder the deployment of some applications. Balancing the benefit of the increased transmission rate are the implementation costs such as system complexity, physical plant improvements (e.g., cabling), increased power consumed, etc. What is needed therefore are solutions that enable increased transmission rates through low-cost implementations.

SUMMARY

A system and/or method for frequency division multiplexed high speed physical layer devices, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts, including twisted pair, backplane, and optical applications. The inherent simplicity of Ethernet has enabled application of the technology to various mediums, various speeds, and various distances. These features have enabled Ethernet to become a viable technology option that spans high-speed laboratory networks, commercial networks, and increasingly to consumer networks.

As Ethernet is increasingly deployed, the economies of scale have become more attractive. Maintaining the Ethernet solution as a simple, low-cost solution is therefore a key factor in facilitating its continued expanding adoption.

As noted, Ethernet transmission rates have seen rapid advancement with order-of-magnitude increases in transmission rates being made available in new generations of Ethernet devices. These substantial increases in transmission rates come with certain implementation costs, however, as increases in system complexity, increases in costs for physical plant improvements (e.g., cabling), increases in power consumed, etc. have balanced the benefit of the increase in transmission rate. These implementation costs represent real design challenges when considering the next generation of Ethernet devices (e.g., 40 Gbit/s or 100 Gbit/s).

40 Gbit/s or 100 Gbit/s Ethernet devices for twisted pair applications have not yet been defined. The pace of technological development, however, dictates that such Ethernet devices are already on the near-term horizon. While the bandwidth increase from 10 Gbit/s to 40 Gbit/s or 100 Gbit/s is substantial, so also are the implementation costs of such an advanced solution. These implementation costs can dictate a slow rate of adoption as the development of a low-cost interface based on such technology will take time.

Figure 1:
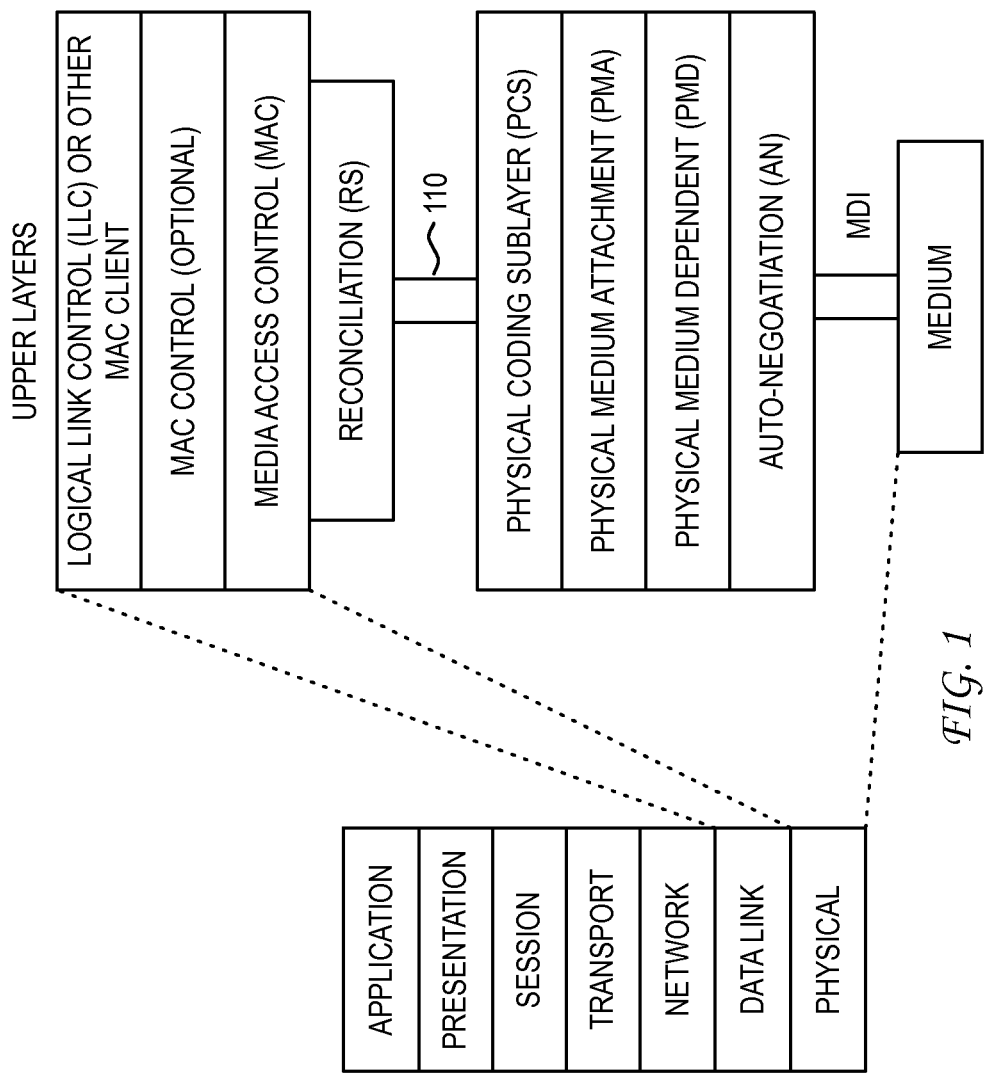
FIG. 1 illustrates an OSI layering diagram.

In accordance with the present invention, a cost-effective solution is provided that enables next-generation transmission (i.e., transmission rates beyond 10 Gbit/s) over structured cabling. To illustrate the features of the present invention, reference is first made to FIG. 1, which illustrates the ISO Open System Interconnection (OSI) reference model and its mapping to the IEEE 802.3 layering.

As illustrated, the PHY includes a physical coding sublayer (PCS), a physical medium attachment (PMA), physical media dependent (PMD), and auto-negotiation (AN). The PHY interfaces with twisted pair cabling over a medium dependent interface (MDI).

As illustrated, the physical layer (often referred to as the PHY) includes a physical coding sublayer (PCS), a physical medium attachment (PMA), physical media dependent (PMD), and auto-negotiation (AN). As illustrated, the PCS is coupled to a reconciliation sublayer (RS), which provides a signal mapping between interface 110 and the MAC layer. In various examples, interface 110 can be based on an Attachment Unit Interface (AUI), media independent interface (MII), serial MII (SMII), reduced MII, (RMII), gigabit MII (GMII), reduced GMII (RGMII), serial GMII (SGMII), quad serial gigabit MII (QSGMII), 10 gigabit MII (XGMII), SXG-MII, XFI, 10-Gbps AUI (XAUI), 40 gigabit MII (XLGMII), 40-Gbps AUI (XLAUI), 100 gigabit MII (CGMII), 10 Gbps AUI (CAUI), or the like. In various embodiments, one or more parts of the PHY can be internal or external to the MAC. In one embodiment, an extender such as the XAUI extender sublayer (XGXS) or XFI can be used between the MAC/PHY. Similar extenders such as XLAUI and CAUI can also be defined for higher transmission rates.

In general, the PMA abstracts the PCS from the physical medium. Accordingly, the PCS can be unaware of the type of medium. The primary functions of the PMA include mapping of transmit and receive code-groups between the PCS and PMA, serialization/de-serialization of code-groups for transmission/reception on the underlying PMD, recovery of clock from the coded data (e.g., 4B/5B, 8B/10B, 64B/65B, 64B/66B, etc.) supplied by the PMD, and mapping of transmit and receive bits between the PMA and PMD.

The PMD is generally responsible for generating electrical or optical signals depending on the nature of the physical medium connected. PMD signals are sent to the medium dependent interface (MDI), which is the actual medium connected, including connectors, for the various media supported.

In general, AN provides a linked device with the capability to detect the abilities (modes of operation) supported by the device at the other end of the link, determine common abilities, and configure for joint operation. Typically, the AN process identifies the best possible mode of operation (or highest common denominator) that is shared by the two PHY devices. Here, a particular priority between different modes of operation can be defined, for example, where a higher speed is preferred over a lower speed, and full duplex is preferred over half duplex at the same speed. AN can also be applied asymmetrically to a link.

In one embodiment, the AN can be designed to support multiple modes. For example, the AN can be designed to support a 40 Gbit/s PHY operating mode in addition to standard operating modes at 10 Mbit/s, 100 Mbit/s, 1 Gbit/s, and 10 Gbit/s over structured cabling. In another embodiment, the AN can be designed to select from a plural set of operating modes that include non-standard operating modes (e.g., 2.5 Gbit/s, 5 Gbit/s, etc. transmission over structured cabling) in addition to the standard operating modes noted above. In yet another embodiment, the AN can be used to autonegotiate to a variable rate. Here, each PHY can test the channel and exchange information regarding the channel (e.g., type of cable, length of cable, etc.), which information can be used to select a particular operating mode. In various examples, the AN process can select a 40 Gbit/s transmission rate if Category 7A cabling is detected, select a 10 Gbit/s transmission rate if Category 6A cabling is detected, select a 40 Gbit/s transmission rate if 15 meters of Category 6A cabling is detected, etc. In general, the AN process can be designed to select an operating mode based not only on the capabilities of the PHYs themselves, but also the capabilities of the particular communication channel between them.

The large number of variations in operating modes is due to the large variations in cabling that can be present. As Ethernet PHY technology has advanced, so also has the cabling technology. To facilitate the higher transmission rates, tighter constraints on the quality of the cabling, connectors and magnetics would dictate the replacement of existing infrastructure.

Various types of Ethernet-compatible cabling exist. For example, performance characteristics represented by Category 3 unshielded twisted pair cabling enable 10BASE-T transmission but not 100BASE-TX transmission, which requires performance characteristics exhibited by Category 5 or 5e cabling. Category 6 cabling was then defined as the cable standard for supporting 1000BASE-T operation. Since that time, cabling advancements have led to advanced Category 6A, 7, 7A, which can support frequencies up to 1 Ghz, and enhanced 7A or newer cabling, which can support frequencies up to 2 Ghz and beyond.

The transmission rate on the twisted pair link is dependent on the channel conditions, which itself is dependent on the type of cabling, length of cabling, connectors, etc. As noted, the newer enhanced 7A cabling has up to 2 Ghz of bandwidth. This large amount of bandwidth is believed to be sufficient to support 40 GBASE-T transmission.

It is a feature of the present invention that the implementation costs along with other development costs incurred in the development of next-generation components can be reduced through a solution that promotes the reuse of architectures in existing Ethernet devices.

Figure 2:
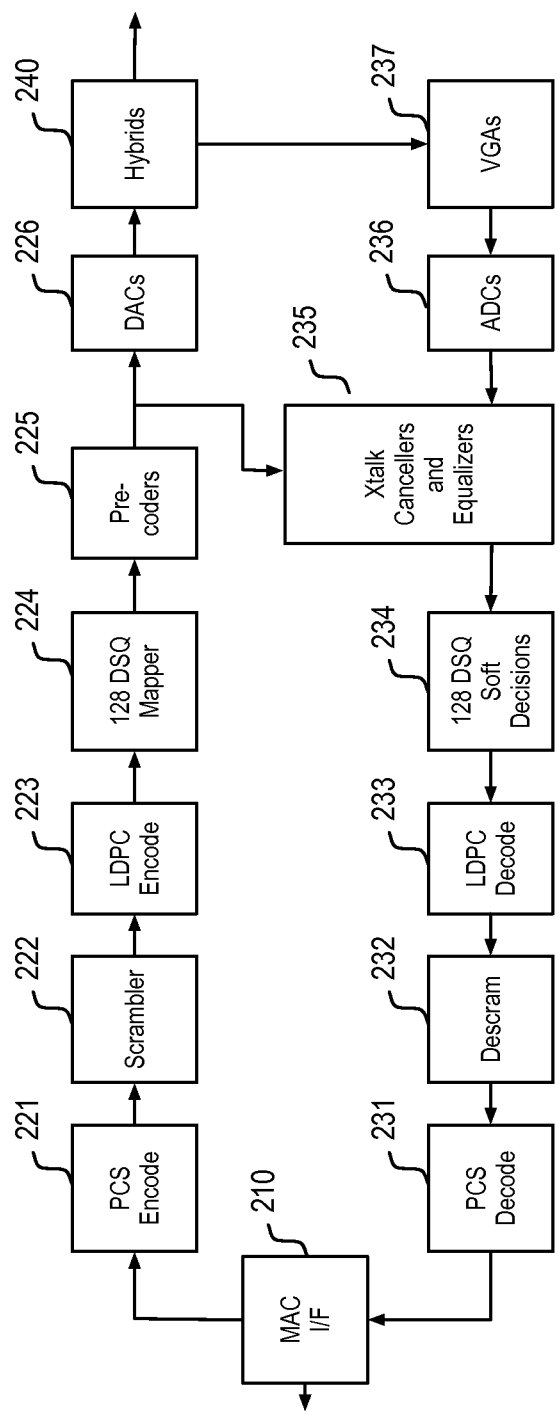
FIG. 2 illustrates an example of an Ethernet physical layer device.

For example, consider FIG. 2, which illustrates an existing Ethernet device architecture for 10 GBASE-T operation. As illustrated, the PHY transceiver includes MAC I/F 210, which can be designed to support XGMII or XAUI interfaces, as an example. On the transmission side, the PHY transceiver can include PCS encode 221, Scrambler 222, Low Density Parity Check (LDPC) 223, 128 Double Square (DSQ) Mapper 224, Pre-Coders 225, Digital-Analog Converters (DACs) 226, and Hybrids 240. Correspondingly, on the receiver side, signals received at Hybrids 240, are processed by Variable Gain Amplifiers (VGAs) 237, Analog-Digital Converters (ADCs) 236, Crosstalk (Xtalk) Cancellers and Equalizers 235, 128 DSQ Soft Decisions 234, LDPC Decode 233, Descrambler 232, and PCS decode 231, which delivers signals to MAC I/F 210.

In the present invention, it is desired to reuse an existing PHY transceiver, such as that illustrated in FIG. 2, in a next-generation device. This architecture reuse can provide a simple mechanism to increase transmission capacity, while obviating the need to incur the large incremental expenses of transitioning to a newly-designed architecture that supports the next standardized transmission rate.

Figure 3:
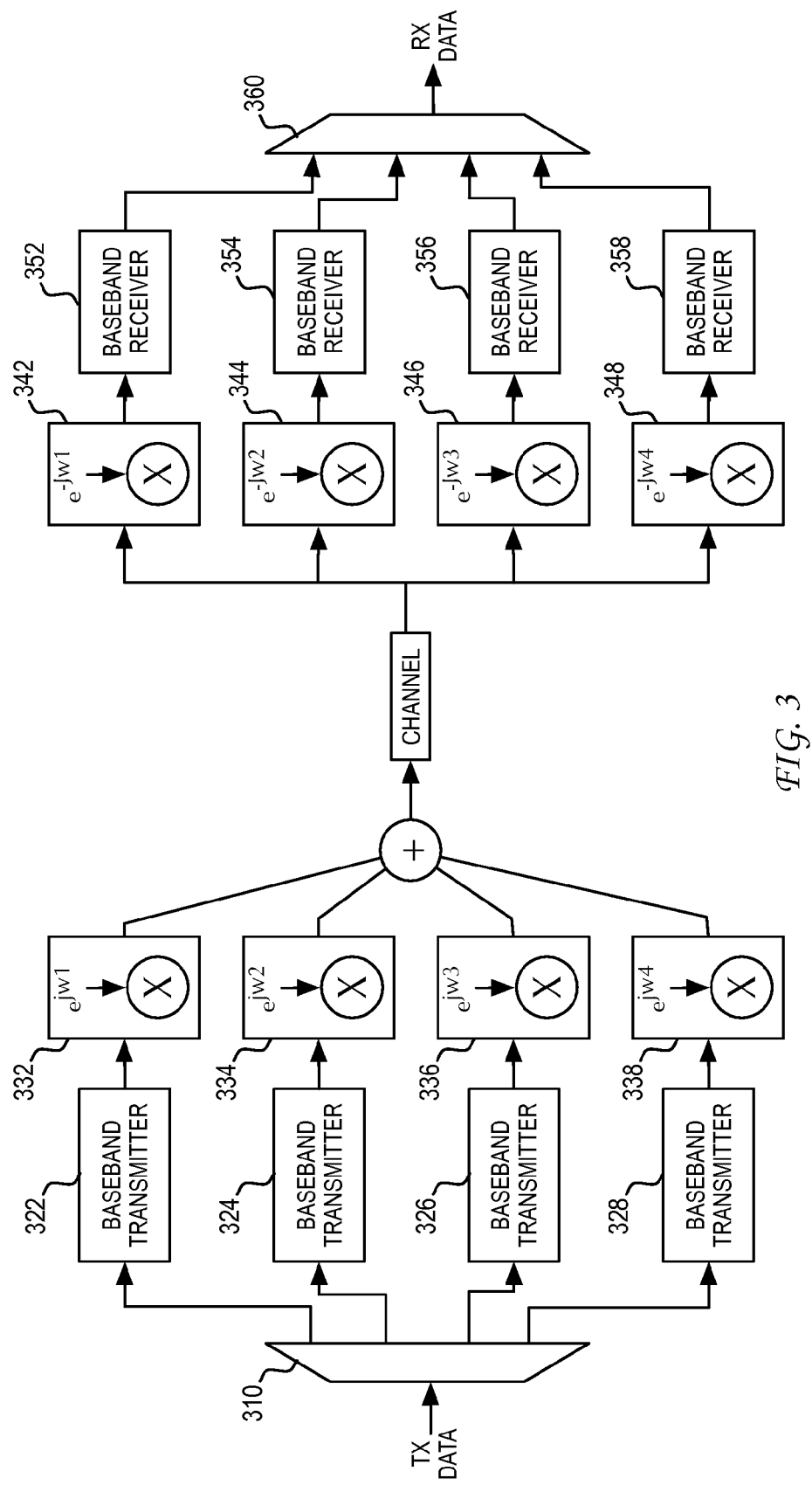
FIG. 3 illustrates an example embodiment of frequency division multiplexing in an Ethernet physical layer device.

FIG. 3 illustrates an example embodiment of leveraging an existing architecture. As illustrated, demultiplexer 310 receives a transmission (TX) data stream and outputs four demultiplexed data streams to baseband transmitters 322, 324, 326, 328. In one example, the received TX data stream is a 40 Gbit/s data stream, and the four demultiplexed data streams are each 10 Gbit/s data streams. As would be appreciated, the principles of the present invention are not dependent on particular combinations of data transmission rates. For example, different ratios of demultiplexing can be used to match a given set of baseband transmitters.

Using the 40 Gbit/s data stream example, demultiplexer 310 is designed to produce four 10 Gbit/s demultiplexed data streams. Each of these 10 Gbit/s demultiplexed data streams can be processed by baseband transmitters 322, 324, 326, 328 that can implement an existing 10G architecture such as that illustrated in FIG. 2. In effect, each baseband transmitter 322, 324, 326, 328 can implement a conventional 10 GBASE-T signaling scheme.

The outputs of baseband transmitters 322, 324, 326, 328 are fed to respective mixers 332, 334, 336, 338. Mixers 332, 334, 336, 338 are designed to implement a frequency division multiplexing scheme, wherein the outputs of at least baseband transmitters 324, 326, 328 are frequency shifted to different parts of the frequency spectrum of the twisted pair communication channel.

Figure 4:
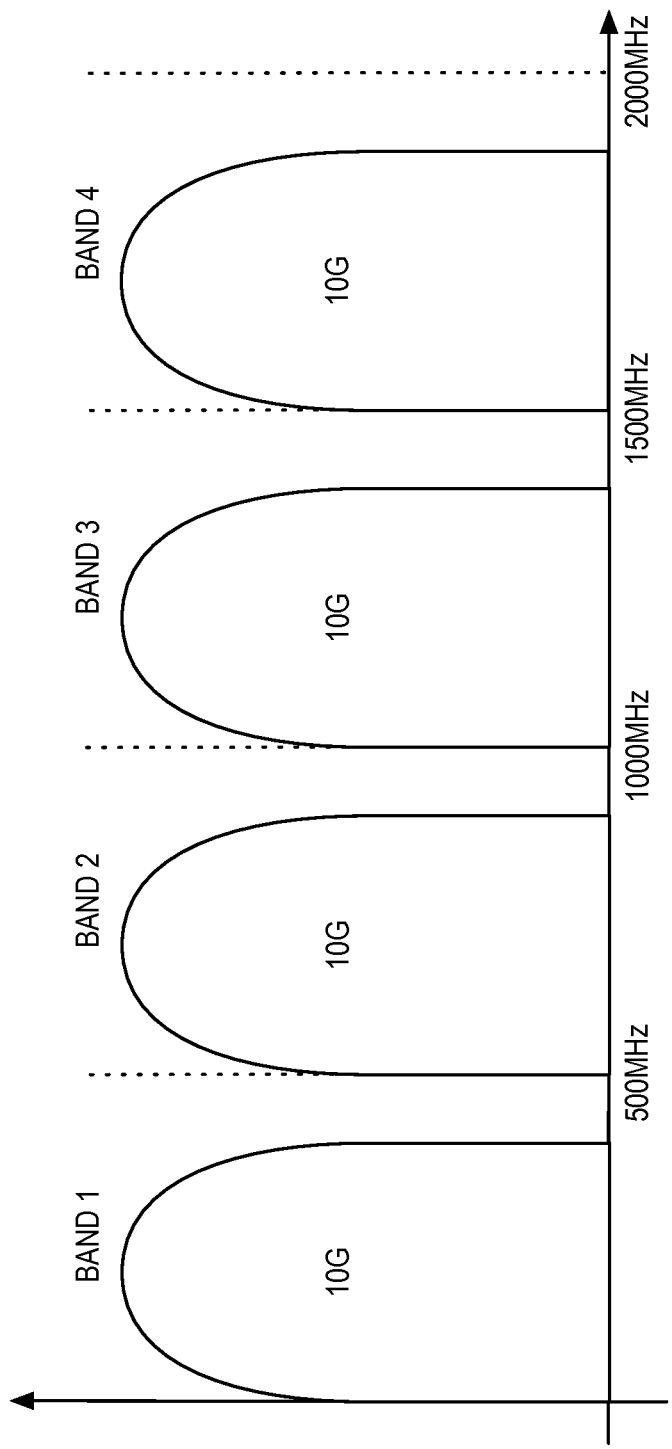
FIG. 4 illustrates an example of a frequency spectrum used by a frequency division multiplexing Ethernet physical layer device.

FIG. 4 illustrates an example of the frequency spectrum of a 40 Gbit/s data stream being transmitted over enhanced 7A cabling using frequency division multiplexing. As noted, enhanced 7A cabling has a bandwidth of about 2 Ghz. Each 10 GBASE-T baseband transmitter would require approximately 400 Mhz of bandwidth. In the illustrated example, the 2 Ghz of frequency spectrum can be divided into four 500 Mhz bands 1-4, wherein each 500 Mhz band is designed to carry the output of one of the baseband transmitters. With usable ranges of 0-400 Mhz, 500-900 Mhz, 1000-1400 Mhz, and 1500-1900 Mhz, approximately 100 Mhz of spacing is included between the frequency-shifted outputs of the baseband transmitters. As would be appreciated, the usable frequency spectrum would be dependent on the cabling selected, which can be selected to facilitate a given number and combination of baseband transmitters, whose combined operating modes would yield the desired throughput.

As illustrated in FIG. 3, the receiving end includes mixers 342, 344, 346, 348, which are designed to capture the baseband signals from the different frequency bands. The outputs of mixers 342, 344, 346, 348 are then provided to respective baseband receivers 352, 354, 356, 358. FIG. 2 illustrates an existing architecture of a 10 GBASE-T receiver that can be used by baseband receivers 352, 354, 356, 358. The outputs of baseband receivers 352, 354, 356, 358 are provided to multiplexer 360, which generates the received 40 Gbit/s data stream.

As has been described, frequency division multiplexing for a twisted cable channel promotes architecture reuse. This architecture reuse enables an efficient scaling mechanism, which reduces the large implementation costs of the next-generation of Ethernet devices. Of course, one of the advantages of the scaling mechanism is that efficient transitions can be made to intermediate rates instead of the next highest standardized rate. For example, by using two sets of 10 Gbit/s baseband transmitters and receivers, a 20 Gbit/s link rate can be supported on a cabling infrastructure that has a bandwidth of 1 Ghz. A low-cost gradual migration path is therefore enabled.

It should be noted that in one embodiment, the frequency division multiplexed scheme can be used without demultiplexer 310 and multiplexer 360. In this embodiment, baseband transmitters 322, 324, 326, 328 can be used as part of an integrated quad-PHY die that supports four separate 10 Gbit/s channels, and includes a controller, switches, buffering, connectors, etc. Here, the frequency division multiplexing scheme creates four separate virtual wires out of one wire, effectively quadrupling the capacity of the cabling.

In another embodiment where demultiplexer 310 and multiplexer 360 are used, multiple modes can be supported by the 40 Gbit/s PHY. Here, all four baseband transmitters 322, 324, 326, 328 can be used for a 40 Gbit/s mode, while only a single baseband transmitter (e.g., 322) is used for a 10 Gbit/s mode. If the single baseband transmitter also supports legacy modes (standardized and/or non-standardized), than other modes such as 5 Gbit/s, 2.5 Gbit/s, 1 Gbit/s 100 Mbit/s, 10 Mbit/s modes can also be supported by the Ethernet device. Selection of one of these various operating modes can be enabled by an AN that supports a selection from among the frequency division multiplexed 40 Gbit/s operating mode, non-multiplexed 10 Gbit/s operating mode, and existing standardized/non-standardized operating modes.

Figure 5:
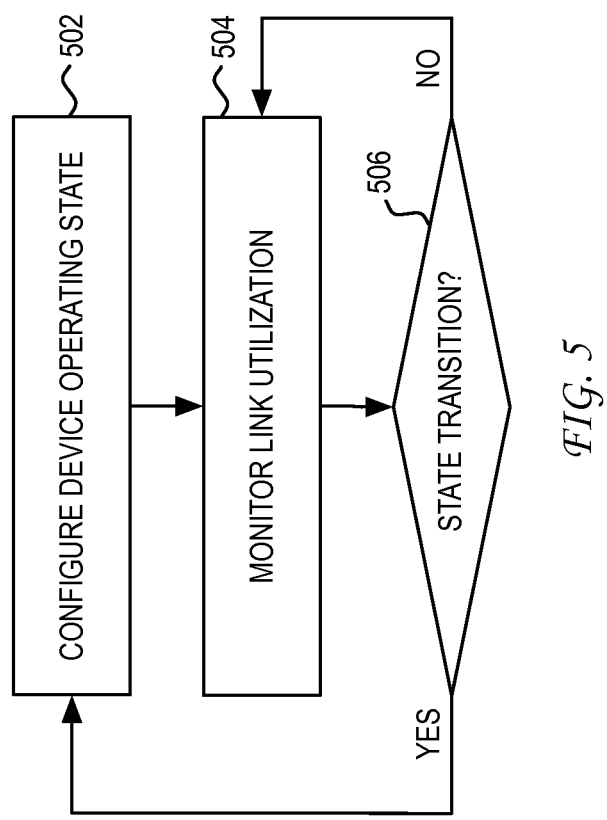
FIG. 5 illustrates a flowchart of a process of the present invention.

FIG. 5 illustrates an energy efficient Ethernet (EEE) application for which the multiple modes of the frequency division multiplexed device can be used. As noted above, energy costs are a key consideration in any implementation, especially those that support higher transmission rates. Energy efficiency is a key consideration in Ethernet devices as energy costs continue to escalate in a trend that has accelerated in recent years.

As illustrated in FIG. 5, an EEE process begins at step 502 where a frequency division multiplexed Ethernet device is configured in an operating state. At startup, for example, the frequency division multiplexed Ethernet device can be configured for 40 G operation with four 10G baseband transmitters being used. After the frequency division multiplexed Ethernet device is configured for 40 G operation, the process continues to step 504 where the link utilization is monitored.

In general, the link utilization can be monitored by an EEE control policy that can be designed to determine when to enter a power saving state, what power saving state (i.e., level of power savings) to enter, how long to remain in that power saving state, what power saving state to transition to out of the previous power saving state, etc. An EEE control policy entity can include software code that can interoperate with one or more layers, including portions of the PHY, MAC, switch, or other subsystems in the host. In one embodiment, the EEE control policy is inside the PHY. The EEE control policy entity can be enabled to analyze traffic on the physical link and to analyze operations and/or processing of data in itself or in its link partner. In this manner, the EEE control policy entity can exchange information from, or pertaining to, one or more layers of the OSI hierarchy in order to establish and/or implement the EEE control policy. The software-based EEE control policy can be designed to base its decisions on a combination of static settings established by an IT manager, default software configuration, properties of the traffic bandwidth on the link itself, time of day, or by some other set of fixed parameters. For example, the EEE control policy can be designed to examine empty or non-empty conditions of ports, queues, buffers, etc. to determine whether to transition to or from a power saving state.

At step 506, while the link utilization is monitored, it is then determined whether the monitored link utilization indicates a state transition is needed. If it is determined that a state transition is not needed, then the process continues to monitor the link utilization. If, on the other hand, it is determined that a state transition is needed, the process then continues back to step 502 where the frequency division multiplexed Ethernet device's operating state is configured. Here, the frequency division multiplexed Ethernet device can be configured to transition from the previous active 40G state to a low power state. In one embodiment, the low power state of the frequency division multiplexed Ethernet device can be configured by lowering the power consumption of one or more of the 10G baseband transmitter channels. This lowered power consumption can be reflected by a reduction in the transmission rate of the one or more of the 10G baseband transmitter channels. In various examples, one of the higher frequency-shifted outputs (e.g., those produced by baseband transmitters 324, 326, 328) baseband transmitters can be turned off yielding a throughput of 30G, or one of the baseband transmitters can be turned off while a second baseband transmitter selects a 5 G operating mode, thereby yielding a throughput of 25G, or all but one of the baseband transmitters is turned off yielding a throughput (e.g., 10G, 5G, 2.5G, 1G, 100M, 10M) of the operating mode selected for the lone active baseband transmitter. The frequency division multiplexed Ethernet device can continue in the selected low power operating state until the link utilization indicates that a return to the active 40G operating state is required.

As has been described, the frequency division multiplexed Ethernet device can support a variety of operating modes that can support different configurations at startup or during active operation. The flexibility of the operating modes is enabled by architecture reuse that enables efficient scaling.

It should be noted that the 40G/10G examples described above are not intended to be limiting in the scalability afforded by the architecture reuse. For example, M 1G baseband transmitters can be used to produce a frequency division multiplexed M*G Ethernet device.

It should also be noted that the principles of the present invention are not to be construed to be limited to the 10G example of FIG. 2. More generally, the principles of the present invention can be applied to any existing architecture, including, 10 Mbit/s, 100 Mbit/s, 1 Gbit/s, 10 Gbit/s (e.g., 10 GBASE-KR, KX4, CR1), 40 Gbit/s (e.g., 40 GBASE-CR4), 100 Gbit/s (e.g., 100 GBASE-CR10), etc. systems. In that regard, the principles of the present invention can also be applied to various standard, non-standard (e.g., 2.5 Gbit/s, 5 Gbit/s, 20 Gbit/s, 25 Gbit/s, 28 Gbit/s, etc.), or future (e.g., 40 Gbit/s, 100 Gbit/s, 250 Gbit/s, 400 Gbit/s, 1000 Gbit/s, etc.) link rate systems. The principles of the present invention can also be applied to shared media links like passive optical networks (PONs) and to point-to-point (P2P) fiber optic networks.

In one embodiment, a variable rate frequency division multiplexed Ethernet device can be generated that is responsive to the channel properties (e.g., type of cable, length of cable, bundling constraints, etc.) discovered by the channel diagnostics. This information can then be used to select the particular number and combination of baseband transmitters/receivers (i.e., need not be the same) to facilitate the bandwidth needs relative to the particular channel. In general, the particular device implementation would be dependent on the baseband transmitters/receivers being used, the amount of cabling bandwidth available, the efficiency of use of the cabling bandwidth available (e.g., carrier spacing), etc. As would be appreciated, the principles of the present invention can also be applied asymmetrically to a link.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A 40 Gbit/s Ethernet physical layer device, comprising:
a demultiplexer that demultiplexes a 40 Gbit/s data stream into four 10 Gbit/s data streams;
four transmitters that implement a 10GBASE-T signaling scheme, each of the four transmitters configured to transmit a respective one of the four 10 Gbit/s data streams;
a first mixer that shifts a first output of a first of the four transmitters to a first frequency spectrum different from a base frequency spectrum;
a second mixer that shifts a second output of a second of the four transmitters to a second frequency spectrum different from the base frequency spectrum;
a third mixer that shifts a third output of a third of the four transmitters to a third frequency spectrum different from the base frequency spectrum; and
a combiner that combines at least part of the first, second and third outputs and at least part of a fourth output from the fourth of the four transmitters for transmission on a single twisted wire pair, wherein the 40 Gbit/s physical layer device has a first operating mode when the four transmitters are activated, and a second operation mode when only a subset of the four transmitters are activated, wherein one of the first open ting mode and the second operating mode is selected based on a type of cabling that includes the single twisted wire pair.

2. The device of claim 1, wherein the four transmitters are assigned to a single 40G communication port.

3. The device of claim 1, wherein at least one of the four transmitters has, in addition to an active state, a low power state that is entered to conserve power when at least another of the four transmitters remains active.

4. A physical layer device, comprising:
an interface with a media access control device, the interface configured for communication of a data stream to the physical layer device;
a demultiplexer that demultiplexes the data stream received by the physical layer device over the interface with the media access control device into a plurality of sub-rate data streams having a lower rate than the received data stream;
a plurality of baseband Ethernet transmitters configured to generate a plurality of respective outputs based on a respective one of the plurality of sub-rate data streams;
a plurality of mixers, the plurality of mixers designed to generate a plurality of frequency shifted outputs, each of the plurality of frequency shifted outputs occupying a different part of a frequency spectrum; and
a combiner that combines at least part of each of the plurality of frequency shifted outputs for transmission onto a single twisted wire pair, wherein the physical layer device has a first operating mode when all of the plurality of baseband Ethernet transmitters are activated, and a second operating mode when only a subset of the plurality of baseband Ethernet transmitters are activated, wherein one of the first operating mode and the second operating mode is selected based on a type of cabling that includes the single twisted wire pair.

5. The physical layer device of claim 4, wherein each of the plurality of baseband Ethernet transmitters are 10GBASE-T transmitters, and the first operating mode enables 40 Gbit/s transmission, and the second operating mode enables 10 Gbit/s transmission.

6. The physical layer device of claim 4, wherein one of the first operating mode and the second operating mode is selected during startup of the physical layer device.

7. The physical layer device of claim 4, wherein switching between the first operating mode and the second operating mode is enabled during operation of the physical layer device to facilitate power savings.

8. The physical layer device of claim 4, wherein the plurality of baseband Ethernet transmitters are integrated with a controller.

9. A method performed by a physical layer device, comprising:
receiving a data stream via an interface between the physical layer device and a media access control device;
demultiplexing the received data stream into a plurality of sub-rate data streams having a lower rate than the received data stream;

generating, via a plurality of mixers, a plurality of respective frequency shifted outputs based on inputs from a respective plurality of baseband Ethernet transmitters, each of the plurality of frequency shifted outputs occupying a different part of a frequency spectrum; and transmitting the plurality of frequency shifted outputs onto a twisted wire pair, wherein the physical layer device has a first operating mode when the plurality of baseband Ethernet transmitters are activated and a second operating mode when only a subset of the plurality of baseband Ethernet transmitters activated, wherein one of the first operating mode and the second operating mode is selected based on a type of cabling that includes the twisted wire pair.

10. The method of claim 9, wherein the received data stream is a Nx10 Gbit/s data stream and the sub-rate data streams are 10 Gbit/s data streams.

11. The method of claim 10, wherein the received data stream is a 40 Gbit/s data stream.

12. The method of claim 9, wherein the received data stream is a Nx1 Gbit/s data stream and the sub-rate data streams are 1 Gbit/s data streams.

* * * * *